(12) United States Patent  
Nuako

(10) Patent No.: US 9,539,949 B2  
(45) Date of Patent: Jan. 10, 2017

(54) HANGER ASSEMBLY

(71) Applicant: John Nuako, Bowie, MD (US)

(72) Inventor: John Nuako, Bowie, MD (US)

( * ) Notice: Subject to any disclaimer, the term of this patent is extended or adjusted under 35 U.S.C. 154(b) by 0 days.

(21) Appl. No.: 14/663,624

(22) Filed: Mar. 20, 2015

(65) Prior Publication Data

US 2016/0272121 A1    Sep. 22, 2016

(51) Int. Cl.
*B60R 9/00* (2006.01)
*B60R 7/04* (2006.01)
*B65B 67/00* (2006.01)

(52) U.S. Cl.
CPC .............. *B60R 7/043* (2013.01); *B65B 67/00* (2013.01)

(58) Field of Classification Search
CPC .............. B60R 7/04; B60R 9/00; B65B 67/00
See application file for complete search history.

(56) References Cited

U.S. PATENT DOCUMENTS

| | | | |
|---|---|---|---|
| 5,383,588 A | 1/1995 | Kazel | |
| 5,415,457 A * | 5/1995 | Kifer | B60N 2/70 224/275 |
| 5,791,614 A | 8/1998 | Sims | |
| D397,565 S * | 9/1998 | Klein | D6/513 |
| 5,836,634 A * | 11/1998 | Finkelman | A45F 5/1026 294/159 |
| D413,464 S * | 9/1999 | Richter | D12/416 |
| D414,358 S * | 9/1999 | Richter | D12/416 |
| 5,954,252 A | 9/1999 | Gebreselassie et al. | |
| D414,635 S | 10/1999 | Richter | |
| D414,967 S * | 10/1999 | Richter | D12/416 |
| 6,131,780 A * | 10/2000 | Becker | A45F 3/04 224/148.6 |
| 6,260,750 B1 | 7/2001 | Chiang | |
| D447,656 S * | 9/2001 | Richter | D12/416 |
| 6,651,941 B1 * | 11/2003 | Kinsel | A45F 5/1026 248/100 |
| 6,832,711 B2 * | 12/2004 | Black | A43B 5/0425 224/261 |
| 6,863,249 B1 * | 3/2005 | Alvord | B60R 9/02 248/208 |
| 6,923,356 B2 * | 8/2005 | Reynolds | A45F 3/14 224/254 |
| 7,395,997 B2 | 7/2008 | Padden | |
| D599,272 S | 9/2009 | Feder | |
| 7,784,864 B2 | 8/2010 | Feder | |
| 2004/0124222 A1 * | 7/2004 | Richter | B60R 7/02 224/311 |
| 2007/0108241 A1 * | 5/2007 | Bass | A45F 5/00 224/162 |

* cited by examiner

*Primary Examiner* — Brian D Nash

(57) ABSTRACT

A hanger assembly for suspending items from a seat in a vehicle includes a hanging unit that may be removably coupled to the seat. The hanging unit may have a plurality of items supported thereon such that the items are suspended from the seat. The hanging unit comprises a mount coupled to the seat. A plurality of hooks is movably coupled to the mount and each of the hooks may have the items suspended thereon.

5 Claims, 3 Drawing Sheets

HANGER ASSEMBLY

BACKGROUND OF THE DISCLOSURE

Field of the Disclosure

The disclosure relates to hanger devices and more particularly pertains to a new hanger device for suspending items from a seat in a vehicle.

SUMMARY OF THE DISCLOSURE

An embodiment of the disclosure meets the needs presented above by generally comprising a hanging unit that may be removably coupled to a seat. The hanging unit may have a plurality of items supported thereon such that the items are suspended from the seat. The hanging unit comprises a mount coupled to the seat. A plurality of hooks is movably coupled to the mount and each of the hooks may have the items suspended thereon.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
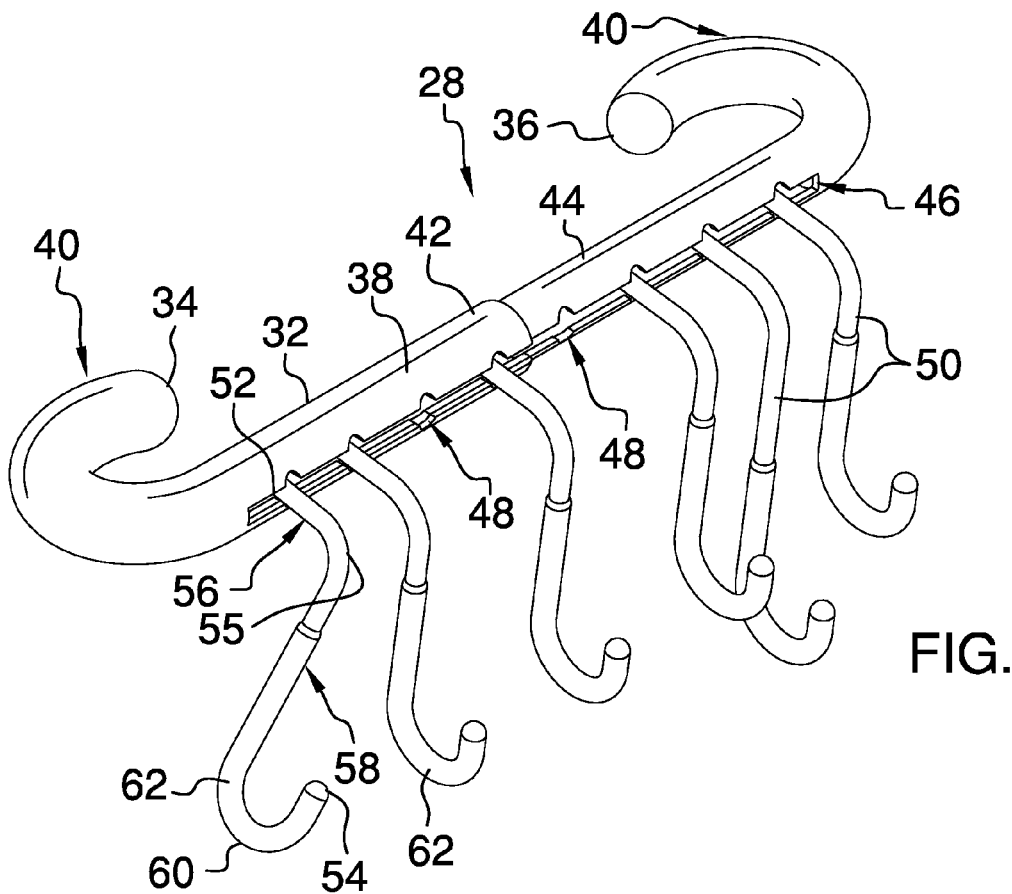
FIG. 1 is a front perspective view of a hanger assembly according to an embodiment of the disclosure.
Figure 2:
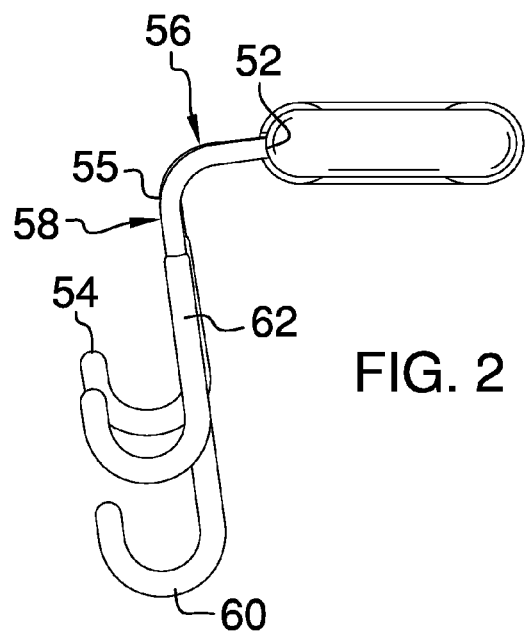
FIG. 2 is a left side view of an embodiment of the disclosure.
Figure 3:
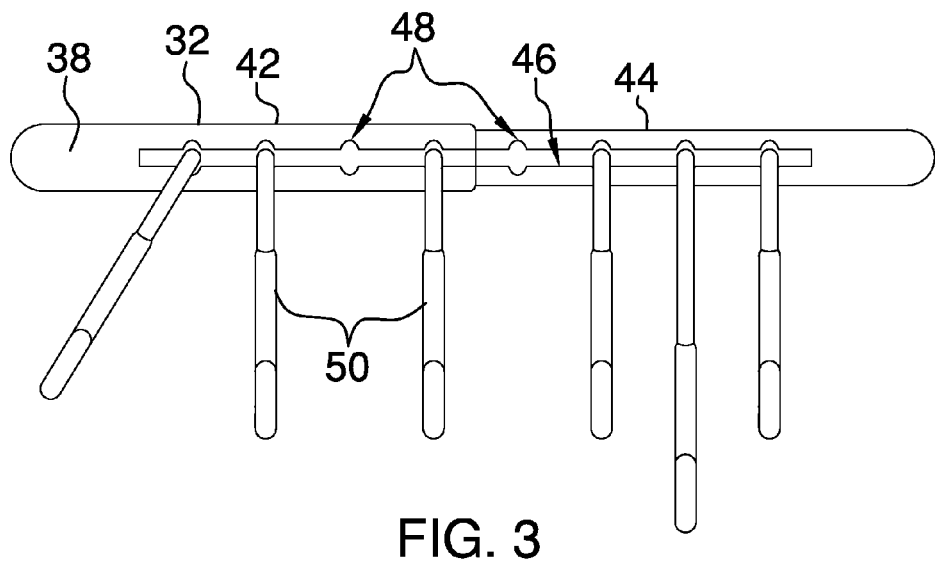
FIG. 3 is a front view of an embodiment of the disclosure.
Figure 4:
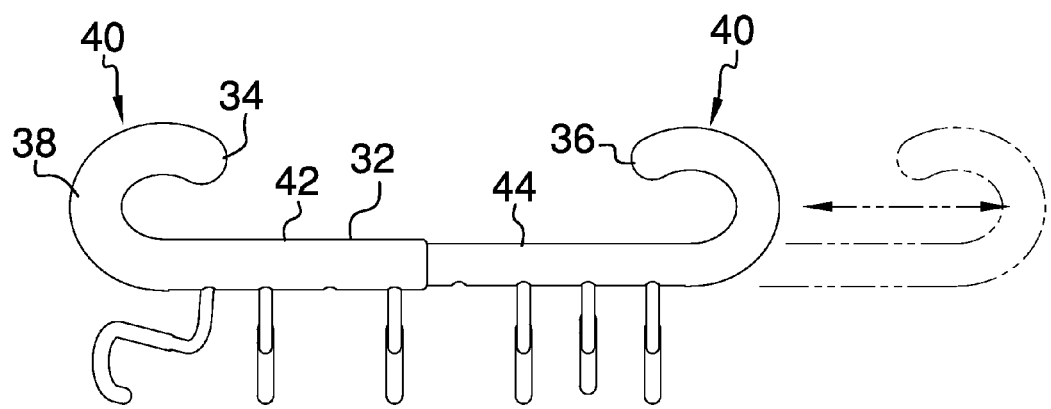
FIG. 4 is a top view of an embodiment of the disclosure.
Figure 5:
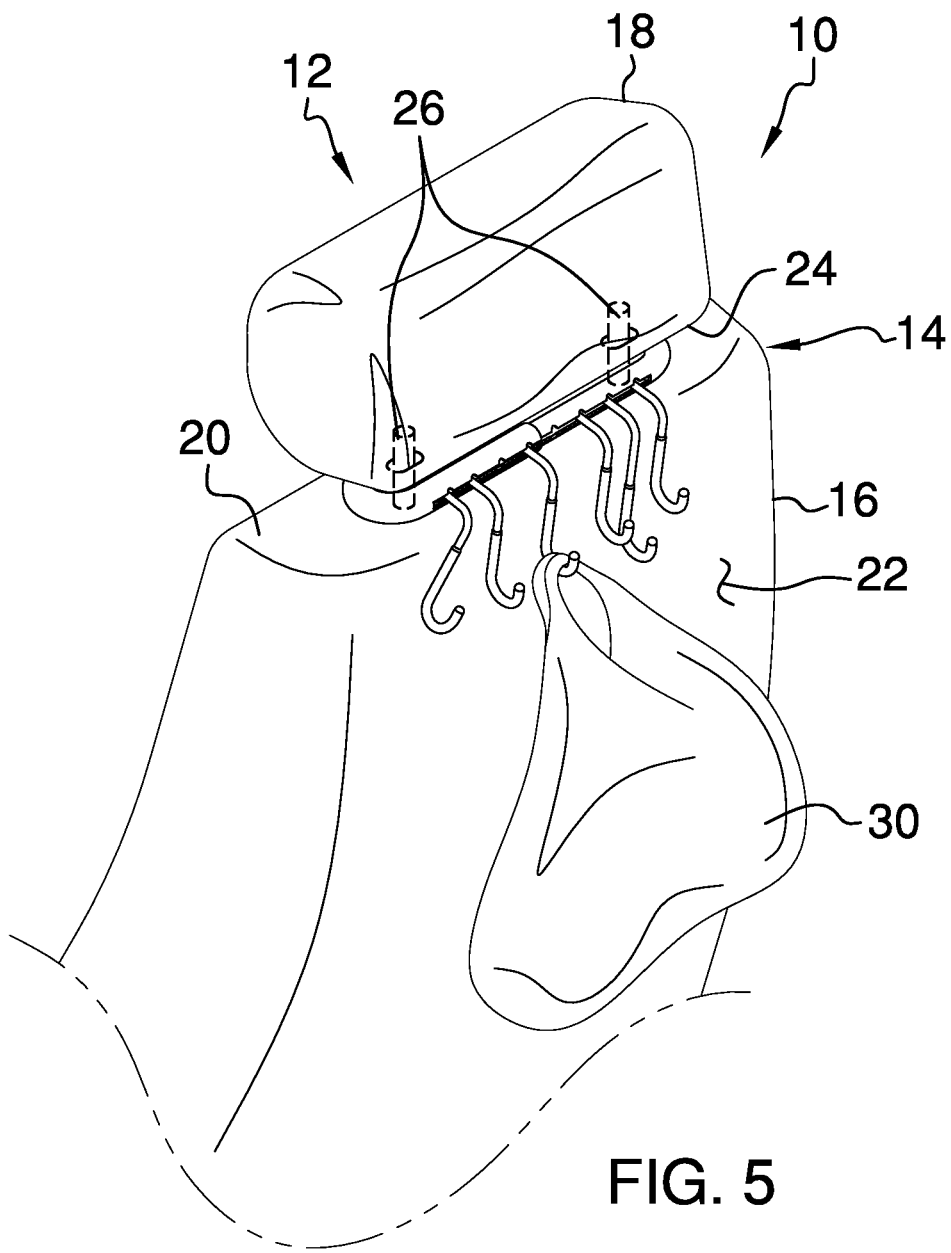
FIG. 5 is a perspective in-use view of an embodiment of the disclosure.

With reference now to the drawings, and in particular to FIGS. 1 through 5 thereof, a new hanger device embodying the principles and concepts of an embodiment of the disclosure and generally designated by the reference numeral 10 will be described.

As best illustrated in FIGS. 1 through 5, the hanger assembly 10 generally comprises a vehicle 12 that has a seat 14 and the seat 14 has a back rest 16 and a headrest 18 attached to the back rest 16. The back rest 16 has a top edge 20 and a back surface 22 and the headrest 18 has a bottom edge 24. The headrest 18 includes a pair of supports 26 extending between the top edge 20 and the bottom edge 24 and the pair of supports 26 is spaced from each other. The vehicle 12 may be a car or the like.

A hanging unit 28 is provided to be removably coupled to the seat 14 and the hanging unit 28 is positioned between the back rest 16 and the headrest 18. The hanging unit 28 engages the pair of supports 26 such that hanging unit 28 is retained on the back surface 22 of the seat 14. The hanging unit 28 may have a plurality of items 30 supported thereon such that the items 30 are suspended from the seat 14. Thus, the items 30 are organized and stored within the vehicle 12. The items 30 may comprise plastic shopping bags or other items that can be suspended.

The hanging unit 28 comprises a mount 32 that has a first end 34, a second end 36 and an outer wall 38 extending between the first end 34 and the second end 36. The outer wall 38 is curved adjacent to each of the first end 34 and the second end 36 such that the first end 34 is directed toward the second end 36 to define a pair of hook portions 40 of the mount 32. The mount 32 has a first portion 42 that is slidably coupled to a second portion 44 such that the mount 32 has a telescopically adjustable length between the hook portions 40. Consequently, the first portion 42 is slidably adjusted on the second portion 44 thereby allowing each of the hook portions 40 to engage one of the supports 26 thusly retaining the mount 32 on the seat 14.

The outer wall 38 has a slot 46 extending therethrough and the slot 46 extends substantially between the hook portions 40. The slot 46 has a plurality of retention portions 48 and the retention portions 48 is spaced apart from each other and distributed along the slot 46. Each of the retention portions 48 has an ovoid shape.

A plurality of hooks 50 is provided and each of the hooks 50 has a first end 52 and a second end 54. Each of the hooks 50 has a first bend 55 thereon to define a first portion 56 forming an angle with respect to a second portion 58. The second portion 58 has a second bend 60 thereon and the second bend 60 is positioned closer to the second end 54 than the first bend 52 such that the second end 60 is directed upwardly along the second portion 58. The first portion 56 of each of the hooks 50 extends into the slot 46 such that first end 52 is positioned within the mount 32. The first portion 56 of each of the hooks 50 is positioned in a selected one of the retention portions 48 of the slot 46 such that the hooks 50 are retained in a selected arrangement on the mount 32. Each of the hooks 50 extends downwardly along the back surface 22 when the mount 32 is attached to the seat 14 and each of the hooks 50 may have the items 30 suspended thereon.

A plurality of grips 62 is provided and each of the grips 62 is positioned on one of the hooks 50. Each of the grips 62 extends from the second end 54 toward the second bend 60. The grips 62 may be comprised of an abrasive material thereby allowing the items 30 suspended on the hooks 50 to frictionally engage the grips 62. Additionally, the second portion 58 of each of the hooks 50 may have a varying length with respect to each other.

In use, the mount 32 is positioned between the head rest 18 and the back rest 16 so the hooks 50 extend downwardly along the back surface 22 of the back rest 16. The length of the mount 32 is telescopically adjusted so each of the hook portions 40 of the mount 32 engages one of the supports 26. The first portion 56 of each of the hooks 50 is positioned within a selected one of the retention portions 48 of the slot 46. The items 30 are suspended from each of the hooks 50.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A hanger assembly and seat combination comprising:
  a vehicle having a seat, said seat having a back rest and a headrest attached to said back rest, said back rest having a top edge and a back surface, said headrest having a bottom edge, said headrest including a pair of supports extending between said top edge and said bottom edge, said pair of supports being spaced from each other; and
  a hanging unit coupled to said seat, said hanging unit being configured to have a plurality of items supported thereon such that the items are suspended from said seat, said hanging unit comprising:
    a mount coupled to the seat;
    a plurality of hooks movably coupled to said mount, each of said hooks being configured to have the items suspended thereon;
    wherein said mount has a first end, a second end and an outer wall extending between said first end and said second end, said outer wall being curved adjacent to each of said first end and said second end such that said first end is directed toward said second end to define a pair of hook portions of said mount;
    wherein said mount has a first portion slidably coupled to a second portion such that said mount has a telescopically adjustable length between said hook portions, said first portion being slidably adjusted on said second portion such that said each of said hook portions engages one of said supports thereby retaining said mount on said seat; and
    wherein said outer wall has a slot extending therethrough, said slot extending substantially between said hook portions, said slot having a plurality of retention portions, said retention portions being spaced apart from each other and distributed along said slot, each of said retention portions having an ovoid shape.

2. The assembly according to claim 1, wherein said hanging unit is positioned between said back rest and said headrest, said hanging unit engaging said pair of supports such that hanging unit is retained on said back surface.

3. The assembly according to claim 1, wherein each of said hooks has a first end and a second end, each of said hooks having a first bend thereon to define a first portion forming an angle with respect to a second portion, said second portion having a second bend thereon, said second bend being positioned closer to said second end than said first bend such that said second end is directed upwardly along said second portion.

4. A hanger assembly and seat combination comprising:
  a vehicle having a seat, said seat having a back rest and a headrest attached to said back rest, said back rest having a top edge and a back surface, said headrest having a bottom edge, said headrest including a pair of supports extending between said top edge and said bottom edge, said pair of supports being spaced from each other; and
  a hanging unit coupled to said seat, said hanging unit being configured to have a plurality of items supported thereon such that the items are suspended from said seat, said hanging unit comprising:
    a mount coupled to the seat;
    a plurality of hooks movably coupled to said mount, each of said hooks being configured to have the items suspended thereon;
    wherein each of said hooks has a first end and a second end, each of said hooks having a first bend thereon to define a first portion forming an angle with respect to a second portion, said second portion having a second bend thereon, said second bend being positioned closer to said second end than said first bend such that said second end is directed upwardly along said second portion;
    wherein said mount has a slot, said slot having a plurality of retention portions;
    said seat has a back surface; and
    said first portion of each of said hooks extends into said slot such that first end is positioned within said mount, said first portion of each of said hooks being positioned in a selected one of said retention portions such that said hooks are retained in a selected arrangement on said mount, each of said hooks extending downwardly along said back surface when said mount is attached to said seat.

5. A hanger assembly and seat combination comprising:
  a vehicle having a seat, said seat having a back rest and a headrest attached to said back rest, said back rest having a top edge and a back surface, said headrest having a bottom edge, said headrest including a pair of supports extending between said top edge and said bottom edge, said pair of supports being spaced from each other;
  a hanging unit removably coupled to said seat, said hanging unit being positioned between said back rest and said headrest, said hanging unit engaging said pair of supports such that hanging unit is retained on said back surface, said hanging unit being configured to have a plurality of items supported thereon such that the items are suspended from said seat thereby facilitating the items to be organized and stored within said vehicle, said hanging unit comprising:
    a mount having a first end, a second end and an outer wall extending between said first end and said second end, said outer wall being curved adjacent to each of said first end and said second end such that said first end is directed toward said second end to define a pair of hook portions of said mount, said mount having a first portion slidably coupled to a second portion such that said mount has a telescopically adjustable length between said hook portions, said first portion being slidably adjusted on said second portion such that said each of said hook portions engages one of said supports thereby retaining said mount on said seat, said outer wall having a slot extending therethrough, said slot extending substantially between said hook portions, said slot having a plurality of retention portions, said retention portions being spaced apart from each other and distributed along said slot, each of said retention portions having an ovoid shape; and a plurality of hooks, each of said hooks having a first end and a second end, each of said hooks having a first bend thereon to define a first portion forming an angle with respect to a second portion, said second portion having a second bend thereon, said second bend being positioned closer to said second end than said first bend such that said second end is directed upwardly along said second portion, said first portion of each of said hooks extending into said slot such that first end is positioned within said mount, said first portion of each of said hooks being positioned in a selected one of said retention portions such that said hooks are retained in a selected arrangement on said mount, each of said hooks extending downwardly along said back surface when said mount is attached to said seat, each of said hooks being configured to have the items suspended thereon.

\* \* \* \* \*